US008731880B2

(12) United States Patent
Todorov

(10) Patent No.: US 8,731,880 B2
(45) Date of Patent: May 20, 2014

(54) INVERTIBLE CONTACT MODEL

(75) Inventor: Emanuil V. Todorov, Redmond, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 185 days.

(21) Appl. No.: 13/232,954

(22) Filed: Sep. 14, 2011

(65) Prior Publication Data

US 2012/0150499 A1 Jun. 14, 2012

Related U.S. Application Data

(60) Provisional application No. 61/382,666, filed on Sep. 14, 2010, provisional application No. 61/437,351, filed on Jan. 28, 2011.

(51) Int. Cl.
*G06F 17/11* (2006.01)
*G06F 17/16* (2006.01)
*G05B 19/19* (2006.01)

(52) U.S. Cl.
USPC ........ 703/2; 703/6; 703/7; 700/245; 700/251; 700/257; 700/260; 700/263

(58) Field of Classification Search
USPC .......... 345/474, 672, 678, 952, 959; 700/245, 700/250, 251, 254, 255, 257, 260–263; 703/2, 6, 7
See application file for complete search history.

(56) References Cited

U.S. PATENT DOCUMENTS

| | | | |
|---|---|---|---|
| 6,054,997 | A | 4/2000 | Mirtich |
| 6,970,171 | B2 | 11/2005 | Baraff |
| 7,355,600 | B2 | 4/2008 | Baraff |
| 7,421,303 | B2 | 9/2008 | Zhang |
| 7,526,456 | B2 | 4/2009 | Zhang |
| 7,610,182 | B2 | 10/2009 | Smith |
| 7,937,359 | B1 | 5/2011 | Zhang |
| 2005/0086040 | A1 | 4/2005 | Davis |
| 2005/0165873 | A1* | 7/2005 | Zhang et al. .................. 708/446 |
| 2006/0282177 | A1 | 12/2006 | Fuller |
| 2007/0268288 | A1 | 11/2007 | Duriez |
| 2009/0105878 | A1* | 4/2009 | Nagasaka ...................... 700/245 |
| 2010/0168950 | A1* | 7/2010 | Nagano ............................ 701/25 |
| 2010/0211368 | A1 | 8/2010 | Grinspun |

OTHER PUBLICATIONS

Kaufman et al., Staggered Projections for Frictional Contact in Multibody Systems, ACM Transactions on Graphics, vol. 27, No. 5, Article 164, Dec. 2008.*
Tassa et al., Stochastic Complementarity for Local Control of Discontinuous Dynamics, Proceedings of Robotics: Science and Systems (2010).*
Todorov, Implicit nonlinear complementarity: A new approach to contact dynamics, 2010 IEEE International Conference on Robotics and Automation, May 3-8, 2010.*
Anitescu, M., and F.A. Potra, "Formulating Dynamic Multi-Rigid-Body Contact Problems With Friction as Solvable Linear Complementarity Problems," Reports on Computational Mathematics, No. 93/1966, Department of Mathematics, University of Iowa, Iowa City, Iowa, Oct. 1996, pp. 1-21.
Anitescu, M., and G.D. Hart, "A Fixed-Point Iteration Approach for Multibody Dynamics With Contact and Small Friction," Mathematical Programming, Series B, 101(1):3-32, Aug. 2004.
Cline, M.B., "Rigid Body Simulation With Contact and Constraints," master's thesis, University of British Columbia, Vancouver, Canada, Jul. 2002, 103 pages.
Stewart, D., and J.C. Trinkle, "An Implicit Time-Stepping Scheme for Rigid Body Dynamics With Coulomb Friction," IEEE International Conference on Robotics and Automation (ICRA '00), San Francisco, Apr. 24-28, 2000, vol. 1, pp. 162-169.
Todorov, E., "Implicit Nonlinear Complementarity: A New Approach to Contact Dynamics," IEEE International Conference on Robotics and Automation, Anchorage, Alaska, May 3-8, 2010, pp. 2322-2329.
Todorov, E., et al., "MuJoCo: A Physics Engine for Model-Based Control," Computer Science & Engineering, University of Washington, Manuscript Under Review, 2011, 8 pages.
Trinkle, J.C., et al., "Dynamic Multi-Rigid-Body Systems With Concurrent Distributed Contacts," Philosophical Transactions of the Royal Society London A, 359(1789):2575-2593, Dec. 2001.

* cited by examiner

*Primary Examiner* — Kandasamy Thangavelu
*Assistant Examiner* — Michael P Healey
(74) *Attorney, Agent, or Firm* — Christensen O'Connor Johnson Kindness PLLC

(57) ABSTRACT

Methods for computing the inverse dynamics of multibody systems with contacts are disclosed. Inverse dynamics means computing external forces that cause a system to move along a given trajectory. Such computations have been used routinely for data analysis and control synthesis in the absence of contacts between rigid bodies. The disclosed inverse dynamics methods include the ability to handle contacts. The disclosed methods include the following steps: projecting the discrete-time equations of motion from joint space to contact space; defining the forward dynamics in contact space as the solution to an optimization problem; using the features of this optimization problem to obtain a unique inverse—which turns out to correspond to the solution to a dual optimization problem; solving the latter using standard methods for numerical optimization; projecting the solution from contact space back to joint space and finding the external forces. The corresponding methods for computing forward dynamics are also disclosed.

17 Claims, No Drawings

INVERTIBLE CONTACT MODEL

CROSS-REFERENCE TO RELATED APPLICATION

This application claims the benefit of Provisional Application No. 61/382,666, filed Sep. 14, 2010, the entire disclosure of which is hereby incorporated by reference herein.

STATEMENT OF GOVERNMENT LICENSE RIGHTS

This invention was made with government support under EFRI-0836042 awarded by the National Science Foundation and 7R21NS063136-02 awarded by the National Institutes of Health (NIH). The government has certain rights in the invention.

BACKGROUND

Inverse dynamics are used to compute the external forces that would cause a multibody system to follow a given movement trajectory. This computation is useful for data analysis where the trajectory is measured, as well as for control synthesis where the trajectory is prescribed. However modern methods for inverse dynamics are incapable of handling contact phenomena. Indeed such phenomena are generally non-invertible. For example, imagine pushing against a table while your movements are being recorded by a motion capture device. The goal of inverse dynamics in this case would be to reconstruct your muscle forces from the motion data. However the data do not contain sufficient information to reconstruct these forces, because any vertical force was counteracted by the table. The apparent impossibility of this computation is likely the reason why inverse methods for contact dynamics are lacking.

Modeling and simulation of contact phenomena is essential in a number of fields including robotics, mechanics, and graphics. Earlier approaches were based on spring-damper models which often lacked stability and accuracy even after considerable manual tuning. More recently the physics of contact were cast as a liner complementarity problem.

We overcome this conceptual problem by noting that rigid-body dynamics are only an approximation to the laws of physics, and this approximation is only accurate in the absence of contacts. When two bodies collide they no longer behave as rigid bodies, but instead undergo local deformations. Such deformations can in principle be captured by more complex mathematical models. However the necessary computations are prohibitively expensive and cannot be implemented in real-time simulation and control scenarios, and furthermore these more complex models involve large numbers of parameters which are hard to estimate. Thus the standard practice is to rely on rigid-body approximations, and formulate contact dynamics that mimic the underlying physical phenomena as closely as possible on a macroscopic level. The most popular such approximation is inelastic contact with Coulomb friction. This approximation however happens to be non-invertible.

Our approach is to define somewhat different approximations that have comparable accuracy but are invertible. Intuitively, our approximations allow small deformations at the contact points, so that pushing harder against the table in the above example results in some penetration that is visible in the motion capture data—and so the force can be recovered from the data. Unlike the older spring-damper models of contact (which also allow deformations and are trivially invertible), our methods belong to the class of modern time-stepping schemes that solve directly for the velocity at the next time step (see Stewart and Trinkle 1996). This approach has proven to be superior because it avoids the instabilities associated with spring-dampers. Indeed all modern software for multibody forward dynamics rely on time-stepping schemes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An invertible method for simulating the contact dynamics of a plurality of rigid bodies is disclosed, including embodiments of the method for calculating the forward dynamics, and embodiments for calculating the inverse dynamics. A novel aspect of the method is that the forward and inverse dynamics of defined consistently.

In a particular embodiment the method includes calculating external forces (u) that when applied to a plurality of rigid bodies would produce a specified trajectory of the rigid bodies, including (i) on a computer system, defining models of a plurality of rigid bodies including all joints connecting any two of the plurality of rigid bodies;

(ii) specifying a trajectory for the plurality of rigid bodies over a series of points in time;

(iii) at each point in time, obtaining a current joint-space position (q), a velocity (w), and a next-step velocity (w') for the plurality of rigid bodies from the specified trajectory;

(iv) computing a joint-space inertia matrix (M) for the plurality of rigid bodies;

(v) computing a vector of non-contact forces (n) that act on the plurality of rigid bodies and do not depend on the external force;

(vi) identifying all contact points among the plurality of rigid bodies;

(vii) constructing a Jacobian (J) that maps velocities from joint-space to contact-space;

(viii) computing a contact-space inverse inertia matrix (A);

(ix) computing a contact force (f) at each of the contact points by minimizing a scalar objective function ($L_{inv}$), wherein the minimizer of the objective function coincides with the solution to a corresponding forward dynamics problem for the plurality of rigid bodies; and (x) computing the external forces (u) that when applied to the plurality of rigid bodies would produce the specified trajectory, as a function of f, M, J, w, w', and n.

In an embodiment the external forces are calculated as:

$$u = M_\lambda h^{-1}(w'-w) - M_\lambda M^{-1}(n + h^{-1} J^T f).$$

In an embodiment, the scalar objective function is of the form:

$$L_{inv}(f) = f^T(v + A^T \nabla q(v)) + p(f),$$

c is computed as:

$$c = J(w + M^{-1} hn + M_\lambda^{-1} hu),$$

and p and q are convex user-specified scalar functions.

In an embodiment, the scalar objective function is $$L_{inv}(x) = r(Af(x)`c - v(x)),$$

wherein c is computed as $$c = J(w + M^{-1} hn),$$

r is a user-specified scalar function that is monotonic in the norm of its vector argument, and the functions f(x) and v(x) are calculated from:

$$f_n(x) = \max(o, v_{min} - x_n)$$

$$v_n(x) = \max(v_{min}, x_n)$$

$$f_t(x) = -s(x)x_t$$

$$v_t(x) = (1 - s(x))x_t$$

where, $$s(x) = \min\left(1, \frac{\mu f_n(x)}{\|x_t\|}\right).$$

In an embodiment of the invention the trajectory of a plurality of rigid bodies that would be produced by a given time-series of external forces are calculated on a computer system, including (i) defining models of a plurality of rigid bodies including all joints connecting any two of the plurality of rigid bodies;

(ii) specifying a time-series of external forces to be applied to the plurality of rigid bodies over a series of points in time;

(iii) at each point in time, obtaining a current joint-space position and velocity from one of an initial condition and the results of a previous time step, and the external forces acting during the current time step;

(iv) computing a joint-space inertia matrix for the plurality of rigid bodies;

(v) computing a vector of non-contact forces that act on the plurality of rigid bodies and do not depend on the external force;

(vi) identifying all contact points among the plurality of rigid bodies;

(vii) constructing a Jacobian that maps velocities from joint-space to contact-space;

(viii) computing a contact-space inverse inertia matrix;

(ix) computing a contact force at each of the contact points by minimizing a scalar objective function ($L_{fwd}$), which can be one of:

$$L_{fwd}(f) = \frac{1}{2} f^T A f + f^T c + p(f) + q(Af + c), \quad (A)$$

wherein c is computed as (9), and p and q are convex user-specified functions.

$$L_{fwd}(x) = r(Af(x) + c - v(x)), \quad (B)$$

wherein c is computed as $$c = J(w + M^{-1}hn)$$

r is a user-specified function that is monotonic in the norm of its vector argument, and the functions f(x) and v(x) are calculated from:

$$f_n(x) = \max(o, v_{min} - x_n) \quad (C)$$

$$v_n(x) = \max(v_{min}, x_n)$$

$$f_t(x) = -s(x)x_t$$

$$v_t(x) = (1 - s(x))x_t$$

where, $$s(x) = \min\left(1, \frac{\mu f_n(x)}{\|x_t\|}\right),$$

and $$L_{fwd}(x) = r(Af(x) + c - v(x)),$$

wherein c is computed as $$c = J(w + M^{-1}hn + M_\lambda^{-1}hu)$$

r is a user-specified function that is monotonic in the norm of its vector argument, and the functions f(x) and v(x) are calculated from:

$$f_n(x) = \max(o, v_{min} - x_n)$$

$$v_n(x) = \max(v_{min}, x_n)$$

$$f_t(x) = -s(x)x_t$$

$$v_t(x) = (1 - s(x))x_t$$

where, $$s(x) = \min\left(1, \frac{\mu f_n(x)}{\|x_t\|}\right);$$

(ix) computing the next state velocity (w') as a function of f, M, J, w, and n, and integrating this velocity to obtain a next-state position.

REFERENCES CITED

Drumwright, E. and Shell, D. (2009). A robust and tractable contact model for dynamic robotic simulation (hereby incorporated by reference in its entirety). *Proceedings of the 2009 ACM Symposium on Applied Computing.*

Featherstone, R. (2008). *Rigid Body Dynamics Algorithms.* Springer.

Kaufman, D., Sueda, S., James, D. and Pai, D. (2008). Staggered projections for frictional contact in multibody systems (hereby incorporated by reference in its entirety). *ACM Transactions on Graphics, Proceedings of ACM SIGGRAPH Asia* 2008, V. 27, Issue 5, December 2008.

Nocedal, J. and Wright, S. (1999). *Numerical Optimization.* Springer

Stewart, D. and Trinkle, J. (1996). An implicit time-stepping scheme for rigid-body dynamics with inelastic collisions and Coulomb friction (hereby incorporated by reference in its entirety). *International Journal for Numerical Methods in Engineering,* Vol. 39, Issue 15, pages 2673-2691, Aug. 15, 1996.

Todorov, E. (2010). Implicit nonlinear complementarity: A new approach to contact dynamics. In proceedings of the *IEEE International Conference on Robotics and Automation.*

Todorov, E. (2011). A convex, smooth and invertible contact model for trajectory optimization. *In proceedings of the IEEE International Conference on Robotics and Automation.*

DETAILED DESCRIPTION

The present method may be applied to the range of applications for contact dynamics, some of which are identified above. For example, the user may begin by designing, or otherwise obtaining, a system, for example a robotic system, that includes a plurality of movable components or bodies, wherein at least some of the bodies contact each other and/or may contact each other over a particular course of motion. Typically some or all of the plurality of bodies will be jointed with another of the plurality of bodies. The bodies may be subjected to a number of forces, including for example (i) non-contact related forces such as gravity, Coriolis forces, and the like, (ii) externally applied forces, for example control forces operable to manipulate the bodies, and (iii) forces associated with the contacts between the bodies. In the exemplary robotic system, a number of actuators, for example electro-mechanical actuators, are provided that are controllable to apply the external forces to the bodies.

In an exemplary situation, a user will design or otherwise obtain physical properties of the bodies, for example shapes, dimensions, joint type and location, limits or stops, etc. The plurality of bodies are then modeled on a computer to simulate the dynamics and contact dynamics of the plurality of bodies in various scenarios. In a robotic system it may be desirable to apply the control forces to the plurality of bodies to generate a desired prescribed trajectory. In other applications, externally applied forces are known, and the simulation is run to calculate the dynamic response of the plurality of bodies.

It will also be appreciated by persons of skill in the art that a more realistic graphical animation simulating, for example, the contact dynamics of a jointed object will have benefits for producing animation sequences that look more authentic, and are aesthetically satisfying. For example, accurate contact dynamic simulations will find application for movie-making and the like. It will be appreciated, for example, that the dynamic behavior of jointed and/or otherwise contacting objects in non-terrestrial environments may be simulated for educational or entertainment purposes.

DEFINITIONS AND NOTATION

Our methods apply to multibody systems which consist of an arbitrary number of rigid bodies that may be connected with joints. The only restriction is that the joints cannot form loops. We allow arbitrary joint types, including hinge joints, prismatic (sliding) joints, ball joints, and any combination of the above. In general, "joint" means that the motion of the two bodies relative to each other is constrained in some way. The relative positions of bodies connected by joints are parameterized by quantities that form the joint space of the system. Note that some bodies may be free-floating, or may serve as a mobile base of a multi-joint mechanism (such as the torso of a human body). The Cartesian position and orientation of these "root" bodies are directly included in the joint-space description. The Cartesian positions and orientations of all other bodies are recovered from the joint-space description by a forward kinematics computation.

In addition to Cartesian and joint space, we will also perform computations in contact space. This space is defined as follows. At each contact point (between any two bodies that are in sufficiently close proximity), define a 3D frame with its Z-axis oriented along the normal to the contacting surfaces. We can now express the relative velocities and contact forces in this frame. Concatenating all such frames yields the contact space of the system. Unlike the joint space and the Cartesian space that always have the same dimensionality, the dimensionality of the contact space is three times the number of contacts—which varies depending on the current configuration of the system.

Below we introduce the notation we use, and provide brief definitions. All this is standard terminology, and a person skilled in the art will be able to replicate our work based on this disclosure. Detailed explanations of the standard concepts and algorithms we refer to can be found in multiple textbooks, such as (Featherstone, 2008) and (Nocedal and Wright, 1999). Whenever we introduce a novel concept or algorithm, we include the necessary technical details.

| | |
|---|---|
| N | Number of independent degrees of freedom in the multibody system. |
| q | Vector of position coordinates specifying the spatial configuration of the multibody system. This includes all joint angles as well as the Cartesian positions and orientations of root bodies. |
| w | Vector of joint velocities, with dimensionality dim(w) = N. Generally we have w = dq/dt, except when q contains quaternions (specifying root orientations) in which case special formulas for quaternion differentiation are used and dim(q) > dim(w). |
| u | Vector of external forces. dim(u) = N. |
| M(q) | N-by-N joint-space inertia matrix, which may be computed with the well-known Composite Rigid Body algorithm, for example. |
| n(q, w) | Vector of Coriolis, centrifugal, gravitational, spring-damper, drag forces, and any other forces that are uniquely determined given (q, w). dim(n) = N. This vector may be computed with the well-known Recursive Newton-Euler algorithm, for example. |
| K(q) | Number of active contacts. The contacts depend on the spatial configuration of the multibody system, and are computed at each time step by standard collision detection algorithms. At each contact point a 3D coordinate frame is constructed, with the first two axes oriented along the tangent and the third axis oriented along the normal to the contacting surfaces. Concatenating all contact frames yields a contact space of dimensionality 3K. |
| v | Vector of contact-space velocities, dim(v) = 3K. |
| f | Vector of contact forces. dim(f) = 3K. These forces are impulsive; see below. |
| J(q) | 3K-by-N Jacobian matrix, mapping velocities from joint to contact space: v = J w |
| A(q) | 3K-by-3K inverse inertia matrix in contact space, computed as $A = J M^{-1} J^T$ |

Equations of Motion of Multibody Systems with Contact

The equations of motion in continuous time are $$M(q)dw = (n(q,w)+u)dt + J(q)^T f \quad (1)$$

Note that the contact forces are not scaled by dt, but are treated as impulses (we will use the term "force" for simplicity). In the absence of contact forces, eq (1) can be used to compute both the forward and inverse dynamics directly. Contact is what makes the computations complicated. Thus our strategy is to first perform all non-contact-related computations which can be done with standard methods, and then project the dynamics in contact space, thereby isolating the contact dynamics problem from the rest of the computation.

Using Euler approximation, eq (1) can be represented in discrete time as $$M_t w_{t+1} = M_t w_t + (n_t + u_t)h + J_t^T f_t \quad (2)$$

where h is the discretization time step. Multiplying by $J_t M_t^{-1}$ and using v=Jw, we obtain the discrete-time equations of motion in contact space:

$$A_t f_t + c_t = v_{t+1} \quad (3)$$

where the vector $c_t$ is defined as $$c_t = J_t w_t + J_t M_t^{-1}(n_t + u_t)h \quad (4)$$

This vector represents the contact-space velocity which would result if $f_t=0$. It will play an important role later. In one of the methods disclosed below we will need a modified version of this vector which does not include the external force u.

Eq 3 represents the dynamics of the multibody system projected in contact space. Once this equation is solved, it is straightforward to project the solution back into joint space and complete the inverse dynamics computation, as explained later.

We will now focus on eq (3) and drop the time indices for clarity, leaving us with $$Af + c = v \quad (5)$$

The forward and inverse dynamics computations in contact space can be represented as the (abstract for now) mappings $$(A, c) \xrightarrow{\text{forward}} (f, v)$$

$$(A, v) \xrightarrow{\text{inverse}} (f, c)$$

In both cases the matrix A is given. In forward dynamics we are also given the next-step velocity before contact c, and need to compute the contact force f and next-step velocity after contact v. In inverse dynamics, we are given the next-step velocity after contact v, and need to compute the contact force f and the next-step velocity before contact c. In the present method this is done in such a way that the two mappings are indeed inverses of each other. For example, if we start with A, c and obtain the corresponding v from the forward dynamics, and then provide this v to the inverse dynamics, the latter should recover the c we started with, and furthermore the f computed in the forward and inverse dynamics should be the same. The methods disclosed here satisfy these requirements. This is believed to be a novel aspect of the present method.

It should be noted that in both the forward and inverse dynamics computations, eq (5) involves twice as many unknowns as the number of equality constraints present. Thus additional information is needed to solve this equation. The additional information comes from the (approximate) laws of contact and friction that couple the contact velocities and forces in a complicated way, as explained next.

Forward Contact Dynamics as the Solution to a Complementarity Problem

The conventional approach to forward contact dynamics does not prescribe contact interactions using direct formulas, but instead defines them as the solution to a complementarity problem—which is then solved numerically via an iterative algorithm. Complementarity refers to constraints beyond the linear equality constraint given by eq (5). These constraints are identical for all contacts, thus we describe them for a single contact. The 3D force vector f for the contact of interest will be partitioned as $f=(f_t, f_n)$ where the subscript 'n' refers to the contact normal direction while the subscript 't' refers to the tangential (friction) direction. The contact-space velocity vector, v. may be similarly partitioned as $v=(v_t, v_n)$ The first set of constraints says that the contact force must lie within the friction cone defined by the contact friction coefficient μ:

$$f_n \geq 0$$

$$\mu f_n \geq \|f_t\| \quad (6)$$

Physically, these constraints mean that the normal force cannot pull, and the friction force cannot exceed a fraction of the normal force given by the friction coefficient. This friction cone is sometimes approximated with a pyramid for computational efficiency. A similar constraint is imposed on the normal velocity, so as to avoid penetration:

$$v_n \geq v_{min} \quad (7)$$

The user-specified constant $v_{min}$ can be set to zero for simplicity, although better results are usually obtained by taking into account the current distance d between the contacting bodies, and setting $v_{min}$ so that $d + h v_{min} = 0$. Velocities and forces are further coupled as $$f_n(v_n - v_{min}) = 0$$

$$(\mu f_n - \|f_t\|)\|v_t\| = 0$$

$$v_t = a f_t \text{ for some } a \leq 0 \quad (8)$$

Physically, the first line in constraints (8) says that the normal force and velocity cannot exceed their minimal values simultaneously, e.g., if the contact is already broken ($v_n > v_{min}$) it can no longer generate a force. The second line says that if there is slip (i.e., tangential velocity), the friction force must have already saturated at the friction cone surface. The third line says that slip velocity and friction force must point in opposite directions.

It can be shown that there exists a unique pair of vectors f and v that satisfy constraints (6, 7, 8) along with eq (5). Unfortunately computing these vectors is an NP-hard problem. Thus to obtain real-time performance, one can either apply an iterative algorithm to the NP-hard problem and terminate it when the time is up (producing an inexact solution if the algorithm has not yet converged), or approximate the problem with another problem that can be solved efficiently in real time. One of the methods we disclose belongs to the first category and another to the second category.

General Method for Inverse Dynamics of Multibody Systems with Contact

We now disclose a general method for computing inverse dynamics of multibody systems with contact. Two instantiations of the general method are then disclosed. Both instantiations are based on new formulations of the corresponding forward dynamics, and lead to new forward dynamics methods which we also disclose.

At each time step, our general inverse dynamics method is given access to the current position q, velocity w, and next-step velocity w' obtained from a specified trajectory. The method then computes the external force u and the contact force f that must have acted (i.e., is required) during the current time step in order to generate the given change in velocity (w'−w). The computation involves the following steps:

1. Apply forward kinematics to compute the Cartesian positions and orientations of the rigid bodies comprising the multibody system.
2. Compute the joint-space inertia matrix M.
3. Compute the vector n of Coriolis, centrifugal, gravitational, and any other non-contact forces that are fully determined by the position q and velocity w and can be computed without access to the external force u.
4. Apply collision detection to compute all contact points.
5. Construct the contact Jacobian matrix J that maps velocities from joint space to contact space.
6. Compute the contact-space inverse inertia matrix $A=JM^{-1}J^T$.
7. Define a scalar objective function $L_{inv}$ such that: (a) its minimizer gives the contact force f in the inverse dynamics problem; (b) there exists a corresponding forward dynamics problem where the contact force is equal to that obtained by minimizing $L_{inv}$. Minimize $L_{inv}$ using an iterative method for numerical optimization to obtain the inverse dynamics contact force f.
8. Define the modified inertia matrix $M_\lambda = M + \lambda J_n^T J_n$ where $J_n$ is the sub-Jacobian corresponding to the contact normal directions, and $\lambda \geq 0$ is a parameter which has the effect of increasing inertia in the subspace corresponding to contact penetration (and thus further reducing the small penetrations allowed by our method). Compute the external force as $$u = M_\lambda h^{-1}(w'-w) - M_\lambda M^{-1}(n + h^{-1}J^T f)$$

In the special case $\lambda = 0$ we have $M_o = M$ and so the above formula becomes $$u = Mh^{-1}(w'-w) - (n + h^{-1}J^T f)$$

Note that the forward problem mentioned in step 7 above is not directly used to solve the inverse problem. Nevertheless we require that it exists, so as to make sure that we are indeed solving the inverse of a well-posed forward problem. In the instantiations disclosed below, the forward problem will also be defined as an optimization problem, involving a (generally different) objective function $L_{fwd}$. With such a definition of the forward problem, we can use a very similar procedure to simulate the forward dynamics, as follows.

General Method for Forward Dynamics of Multibody Systems with Contact

At each time step, our general forward dynamics method is given access to the current position q, velocity w and external force u. The method then computes the next-step velocity w' and the contact force f acting during the current time step. The computation involves the following steps:

steps 1 through 6 are the same as in the inverse method
in step 7, compute f by minimizing an objective function $L_{fwd}$ instead of $L_{inv}$
in step 8, compute the next-step velocity as $$w' = w + M^{-1}(hn + J^T f) + M_\lambda^{-1} hu$$

The general inverse method is believed to be novel. We are not aware of any prior methods for inverse multibody dynamics with contact that compute the contact forces by solving an optimization problem. Actually we are not aware of any prior work on inverse contact dynamics regardless of how the contact forces may be computed.

The forward method in its general form stated above is not believed to be novel because prior work has been done on forward dynamics simulation where the contact forces were computed by minimizing objective functions (Kaufman et al, 2008; Drumwright and Shell, 2009). However the specific objective functions $L_{fwd}$ we use in the two instantiations described below are believed to be novel.

Two specific instantiations of the general inverse method will now be described, to aid in understanding the present invention. The two specific examples differ in the definition of the objective function $L_{inv}$. In both cases we start by formulating the corresponding forward dynamics in contact space, and then show how its inverse can be computed via numerical optimization. We also show how the forward dynamics can be computed, again using numerical optimization.

We will restrict our attention to the contact-space computations (step 7) because the rest of the computation follows the general methods described above. More precisely, we assume that the following quantities are already computed and are available as inputs to all of the contact-space solvers described below: w, n, M, $M_\lambda$, J, A. In addition, the external force u is available as input to the forward solvers, while the next-step velocity w' is available as input to the inverse solvers. The output in all cases is the contact force f. What these contact solvers aim to do is solve eq (5) subject to constraints (6, 7, 8), in an approximate way that is computationally efficient and invertible.

First Instantiation: Convex Contact Solver

In this method we solve eq (5) subject to constraint (6), relax constraint (7) to allow some penetration (which as explained earlier is necessary in order to define an inverse), and ignore constraint (8). The justification for ignoring (8) is that the problem becomes substantially easier computationally (because we will end up optimizing a convex function) while at the same time the solutions we obtain are close to satisfying constraint (8). Further details of this application and numerical simulation results can be found in the priority provisional patent application, which is incorporated by reference above, and in our paper (Todorov, 2011). Here we focus on the method itself.

First we define the forward dynamics as an optimization problem. The definition is motivated by the intuitive observation that contact forces have the effect of reducing the relative velocity between the bodies that are in contact. Thus we can approximate the contact force by minimizing kinetic energy in contact space, which is $0.5 \, v^T A^{-1} v$. Recall that v is the next-step velocity in contact space computed as $v = Jw'$, while A is the inverse inertia in contact space. Using eq (5), it can be shown that up to an additive constant which does not affect the optimization, kinetic energy is $0.5 f^T A f + f^T c$, where c is the contact-space next-step velocity that would result in the absence of contact force, computed as $$c = J(w + M^{-1}hn + M_\lambda^{-1}hu) \quad (9)$$

In addition to minimizing kinetic energy, we include a convex function q(v) which penalizes violations to constraint (7). One simple choice is the half-quadratic $$q(v) = \begin{cases} (v_n - v_{min})^2 & \text{if } v_n < v_{min} \\ 0 & \text{otherwise} \end{cases}$$

Other choices are described in (Todorov, 2011). The disclosed method works with any user-specified convex function q(v). We also include a convex function p(f), which again can be chosen in any way as long as it is convex. One simple choice is a quadratic used to regularize the contact forces, i.e., generate the smallest possible vector f that satisfies the remaining constraints. Another use of p(f) is to absorb barrier functions in interior-point methods (see below).

Thus the convex contact solver in the forward direction is defined by the objective function $$L_{fwd}(f) = \frac{1}{2}f^T Af + f^T c + p(f) + q(Af + c) \quad (10)$$

where p and q are user-specified convex functions. Note that q is now written as a function of f and c rather than v, using eq (5). This is because in the forward dynamics v is unknown.

The above objective function is minimized subject to the friction-cone constraint (6), or to a pyramid approximation to the friction-cone constraint. The minimization is done by a standard iterative algorithm. Importantly, both the objective function and the constraint set are convex, thus we are dealing with a convex optimization problem, and such problems are solved very quickly by existing optimization methods. The available optimization methods fall in two classes: active-set methods and interior-point methods. Either type of method can be used here. Active-set methods maintain a representation of which inequality constraints are satisfied with equality at the current solution, and use this representation to restrict the search for a better solution. Interior-point methods replace the constraints with barrier functions, which are convex functions that become infinite when the constraints are violated. The resulting optimization problem is then solved using methods for unconstrained optimization (such as Newton's method). In our case the constraints (6) are a function of f, and so the barrier is a convex function that can be absorbed in the term p(f). A commonly used barrier function is the log-barrier. For example, if we wanted to encode the constraint x>0 for some scalar variable x, the corresponding log-barrier would be $-\kappa \log(x)$ where $\kappa>0$ is a constant that determines how close to the constraint the solution can get.

We now turn our attention to the corresponding inverse problem: given A and v, the goal is to compute f. Note that we cannot do this by simply minimizing $L_{fwd}$, because that function depends on c, which in turn depends on the external force u which is unknown. Instead we have to define a different function, namely $L_{inv}$), which only depends on quantities we know and yet its minimizer is guaranteed to be the same as the minimizer of $L_{fwd}$. We do this by analyzing the conditions that the minimizer of $L_{fwd}$ satisfies, and transforming these conditions into a related optimization problem. Specifically, we know that the contact force f computed in the forward dynamics is such that the gradient of $L_{fwd}$ becomes zero when an interior-point method is used. When an active-set method is used, the quantity that becomes zero is the gradient plus an extra term given by the well-known Karush-Kuhn-Tucker (KKT) conditions for constrained optimization. The resulting $L_{inv}$ turns out to be the same in both cases. For simplicity we only show the derivation for the former case.

Since f is the minimizer of $L_{fwd}$, the gradient must vanish:

$$\nabla L_{fwd}(f) = Af + c + \nabla p(f) + A^T \nabla q(Af+c) = 0$$

This expression still depends on the unknown c. However c only appears as part of Af+c, which equals v from eq (5), and in the inverse dynamics case v is known. Thus we have $$v + \nabla p(f) + A^T \nabla q(v) = 0$$

We now observe that the latter expression is the gradient of the objective function $$L_{inv}(f) = f^T(v + A^T \nabla q(v)) + p(f) \quad (11)$$

and therefore this function is minimized by the same f that minimized $L_{fwd}$ in the forward dynamics. This completes the definition of our pair of objective functions.

To summarize the method, the contact force in the forward dynamics is computed by minimizing the function $L_{fwd}$ given by eq (10) subject to the friction-cone constraint (6) or a pyramid approximation to (6). The contact force in the inverse dynamics is computed by minimizing the function $L_{inv}$ given by eq (11) subject to the same constraint as in the forward dynamics. If the friction cone is approximated with a pyramid in the forward problem, it must be approximated with the same pyramid in the inverse problem so as to obtain a valid inverse. Such pyramid approximations are common in contact simulation (for computational efficiency reasons), and it is important to note that our new methods can work with them. The functions p and q appearing in eq (10, 11) can be any convex functions specified by the user. The optimization may be done using a conventional iterative numerical method, for example, that works in the same way regardless of the particular objective function. Thus the functions p and q are parameters that affect the solution, but do not affect the method used to obtain the solution.

Second Instantiation: Implicit Contact Solver

Recall that a contact solver would ideally solve eq (5) subject to constraints (6, 7, 8). However, as explained earlier, doing this exactly is computationally expensive (because the problem is NP-hard) and furthermore does not allow inverse dynamics to be defined. The convex contact solver described above avoids both problems, by solving eq (5) exactly while satisfying the constraints (6, 7, 8) only approximately—specifically (7) was replaced with the penalty function q which allowed some penetration needed for inverse dynamics, and (8) was altogether ignored.

The implicit contact solver disclosed here is based on the opposite approach: the constraints (6, 7, 8) are satisfied exactly while eq (5) is solved only approximately. The penetration needed for inverse dynamics is obtained by allowing the external forces u to act after the contact forces f. In particular, the contact-space velocity before contact is now defined as $$c = J(w + M^{-1} hn) \quad (12)$$

and no longer depends on the external force u. This makes it possible to compute the contact force f in both the forward and the inverse dynamics by minimizing the same objective function, with A and c given:

$$L_{fwd}(x) = L_{inv}(x) = r(Af(x) + c - v(x)) \quad (13)$$

Since we are now solving for v in both the forward and inverse dynamics, the resulting solution will generally be inconsistent with the observed next-step velocity in the inverse dynamics computation. However this is not a problem here because we are now assuming that the external forces act after the contact forces are applied, and can therefore change the velocity.

The scalar function r in (13) can be any function that increases monotonically with the vector norm of its argument, for example the quadratic function. The idea is to make the argument of r as small as possible. Notice that the argument of r corresponds to the residual of eq (5), and becomes zero only when eq (5) is exactly satisfied. Thus we are minimizing the extent to which eq (5) is violated.

Now we turn to the new variable x introduced in (13), and its relation to the constraints (6, 7, 8). The idea behind the implicit solver is as follows. Instead of treating f and v as independent variables and imposing constraints on them, we define both as functions of the new "hybrid" variable x which has the same dimensionality as f and v. These functions are defined in such a way that for any value of x the resulting f(x) and v(x) satisfy constraints (6, 7, 8), and conversely, any pair of vector f, v that satisfy (6, 7, 8) correspond to some value of x. This implicit representation of contact forces and velocities (as functions of another variable x) is very useful because it guarantees that all relevant constraints are satisfied automatically for any value of x, and so we can treat the optimization with respect to x as unconstrained—which is much easier computationally.

The definitions of the hybrid variable x and the functions f(x) and v(x) are key to the disclosed method. Intuitively, each component of the vector x encodes both a contact velocity and a contact force simultaneously. This is possible due to the nature of the constraints (6, 7, 8). To get an intuition, recall that the contact normal velocity and the contact normal force must be non-negative (in the case $\upsilon_{min}=0$), and at least one of them must be zero at any point in time (first line of constraint (8)). Thus we can use the sign of the corresponding element of x to select which variable (velocity or force) is non-zero and its magnitude to encode the selected variable. The situation for tangential velocities and forces is more complicated, but the general idea is the same.

We now turn to the technical definitions. They are identical for all contacts, so we focus on a single contact and again partition the corresponding 3D vectors into tangential and normal components: $f=(f_t, f_n)$ and similar partitioning for v and x. In the normal direction we have:

$$f_n(x) = \max(0, \upsilon_{min} - x_n)$$

$$\upsilon_n(x) = \max(\upsilon_{min}, x_n) \quad (14)$$

which implements the above idea of using the sign to select the variable being encoded.

In the tangential direction we have $$f_t(x) = -s(x)x_t$$

$$v_t(x) = (1 - s(x))x_t \quad (15)$$

where the scalar function s is defined as $$s(x) = \min\left(1, \frac{\mu f_n(x)}{\|x_t\|}\right) \quad (16)$$

and $\mu$ is the friction coefficient. Thus when the 2D vector $x_t$ is inside the friction cone (in which case s=1), $x_t$ is the negative of the friction force and the tangential velocity is zero. Otherwise s<1 is the scaling constant needed to bring $x_t$ back to the edge of the friction cone. In that case the friction force saturates on the edge of the friction cone, and the tangential velocity is encoded as the part of the vector $x_t$ that sticks out of the friction cone. Additional motivation for these definitions, along with numerical results using the disclosed method can be found in our paper (Todorov, 2010).

To summarize, the contact force f(x) in both the forward and the inverse dynamics is computed by minimizing the objective function (13) with respect to x. The objective function (13) depends on the functions f(x) and v(x) defined in (14, 15, 16), the vector c defined in (12), and the scalar function r which can be any function that is monotonic in the norm of its vector argument. The function r is a parameter, which affects the solution but does not affect the disclosed method for obtaining the solution. The minimization of the objective function (13) is done using an iterative numerical method.

A related method for computing the forward dynamics is obtained by defining the vector c according to (9) rather than (12), and again minimizing (13). This modification corresponds to taking the external forces into account in the contact solver, and no longer allowing them to act after the contact force. The resulting forward method does not have an inverse. However this modified method has the advantage that penetrations are not possible.

The embodiments of the methods disclosed herein for simulating the dynamics of a multibody system of interacting bodies, and including the contact dynamics of the interacting bodies was implemented on a computing apparatus. In the current embodiment the method is implemented on a computer having a 3 GHz INTEL® QX9650™ processor running the WINDOWS 7® operating system. However, an advantage of the method is its suitability for parallel implementation. It will be readily apparent to persons of skill in the art that the present method may be implemented on any suitable computing apparatus as are known in the art, including for example, larger mainframe computers, or the like. Typically a computer code is stored on a computer readable media. An input device is provided to allow the user to enter definitions for the particular problem to be solved, and additional parameters to control the operation of the method.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for calculating external forces that when applied to a plurality of rigid bodies would produce a specified trajectory of the rigid bodies, the method comprising:
   (i) on a computer system, defining models of the plurality of rigid bodies including all joints connecting any two of the plurality of rigid bodies;
   (ii) specifying the trajectory for the plurality of rigid bodies over a series of points in time;
   (iii) at each point of said series of points in time, obtaining a current joint-space position, a velocity, and a next-step velocity for the plurality of rigid bodies from the specified trajectory;
   (iv) computing a joint-space inertia matrix for the plurality of rigid bodies;
   (v) computing a vector of non-contact forces that act on the plurality of rigid bodies and do not depend on the external forces;
   (vi) identifying all contact points among the plurality of rigid bodies;
   (vii) constructing a Jacobian that maps velocities from joint-space to contact-space;
   (viii) computing a contact-space inverse inertia matrix;
   (ix) using the computer system, computing a contact force at each of the contact points by minimizing a scalar objective function, wherein a minimizer of the objective function coincides with a solution to a corresponding forward dynamics problem for the plurality of rigid bodies; and
   (x) using the computer system, computing the external forces that, when applied to the plurality of rigid bodies, would produce the specified trajectory, as a function of the contact forces, the joint-space inertia matrix, the Jacobian, the velocity, the next-step velocity, and the vector of non-contact forces.

2. The method of claim 1, wherein the external forces are calculated as $$u = M_\lambda h^{-1}(w'-w) - M_\lambda M^{-1}(n+h^{-1}J^T f)$$

wherein:
u represents the external forces,
h is a discretization time step,
w represents the velocity,
w' represents the next-step velocity,
M represents the joint-space inertia matrix,
n represents the vector of non-contact forces,
J represents the Jacobian,
f represents the contact forces, and
$M_\lambda = M + \lambda J_n^T J_n$,
wherein $J_n$ is a sub-Jacobian matrix corresponding to normal directions of the contact points, and $\lambda$ is a non-negative user-specified parameter,
and further wherein the superscript T indicates the transpose operation and the superscript −1 indicates the inverse operation.

3. The method of claim 1, wherein the non-contact forces comprise at least one of a Coriolis force, a centrifugal force, a gravitational force, a drag force, or a spring-damper force.

4. The method of claim 1, wherein the step of minimizing the scalar objective function is performed using a convex contact solver.

5. The method of claim 1, wherein the step of minimizing the scalar objective function is performed using an implicit contact solver.

6. The method of claim 1, wherein the plurality of rigid bodies comprise a robotic system, and further wherein the external forces are applied to the rigid bodies with controllable actuators.

7. A method for calculating a trajectory of a plurality of rigid bodies that would be produced by a time-series of external forces, the method comprising:
(i) on a computer system, defining models of the plurality of rigid bodies including all joints connecting any two of the plurality of rigid bodies;
(ii) specifying the time-series of external forces to be applied to the plurality of rigid bodies over a series of points in time;
(iii) at each point of said series of points in time, obtaining a current joint-space position and a current joint-space velocity from one of an initial condition and results of a previous time step, and the external forces of the time-series of external forces acting during a current time step;
(iv) computing a joint-space inertia matrix for the plurality of rigid bodies;
(v) computing a vector of non-contact forces that act on the plurality of rigid bodies and do not depend on the external forces;
(vi) identifying all contact points among the plurality of rigid bodies;
(vii) constructing a Jacobian that maps velocities from joint-space to contact-space;
(viii) computing a contact-space inverse inertia matrix;
(ix) using the computer system, computing a contact force at each of the contact points by minimizing a scalar objective function, using one of
(A) a convex contact solver that minimizes a kinetic energy in said contact-space; and
(B) an implicit contact solver that represents both the contact force and a next-step velocity calculated for the next time step at said current time step in said contact-space parametrically as functions of one independent variable;

(x) using the computer system, computing said next-step velocity as a function of the contact forces, the joint-space inertia matrix, the Jacobian, the current joint-space velocity, and the vector of non-contact forces, and integrating said next-step velocity to obtain a next-state position.

8. The method of claim 7, wherein said next-step velocity is computed as $$w' = w + M^{-1}(hn + J^T f) + M_\lambda^{-1} h u$$

wherein w' represents the next-step velocity,
w represents the current joint-space velocity,
M represents the joint-space inertia matrix,
h is a discretization time step,
n represents the vector of non-contact forces,
J represents the Jacobian,
u represents the time-series of external forces,
f represents the contact forces, and
$M_\lambda = M + \lambda J_n^T J_n$,
wherein is a sub-Jacobian matrix corresponding to normal directions of the contact points, and $\lambda$ is a non-negative user-specified parameter,
and further wherein the superscript T indicates the transpose operation and the superscript −1 indicates the inverse operation.

9. The method of claim 7, wherein the non-contact forces comprise at least one of a Coriolis force, a centrifugal force, a gravitational force, a drag force, or a spring-damper force.

10. The method of claim 7, wherein the plurality of rigid bodies comprise a robotic system, and further wherein the external forces are applied to the rigid bodies with controllable actuators.

11. The method of claim 7, further comprising generating an animated sequence showing the calculated trajectory of the plurality of rigid bodies.

12. A method for controlling a robotic system comprising a plurality of rigid members along a prescribed trajectory comprising:
(i) on a computer system, defining a model of the robotic system comprising the plurality of rigid members including all joints connecting any two of the plurality of rigid members;
(ii) specifying the trajectory for the plurality of rigid members over a series of points in time;
(iii) at each point of said series of points in time, obtaining a current joint-space position, a velocity, and a next-step velocity for the plurality of rigid members from the specified trajectory;
(iv) computing a joint-space inertia matrix for the plurality of rigid members;
(v) computing a vector of non-contact forces that act on the plurality of rigid members;
(vi) identifying all contact points among the plurality of rigid members;
(vii) constructing a Jacobian that maps velocities from joint-space to contact-space;
(viii) computing a contact-space inverse inertia matrix;
(ix) using the computer system, computing a contact force at each of the contact points by minimizing a scalar objective function, wherein a minimizer of the objective function coincides with a solution to a corresponding forward dynamics problem for the plurality of rigid members; and
(x) using the computer system, computing external forces that, when applied to the plurality of rigid members, would produce the specified trajectory, as a function of the contact forces, the joint-space inertia matrix, the Jacobian, the velocity, the next-step velocity, and the vector of non-contact forces.

13. The method of claim 12, wherein the external forces are calculated as $$u = M_\lambda h^{-1}(w'-w) - M_\lambda M^{-1}(n + h^{-1} J^T f)$$

wherein $M_\lambda = M + \lambda J_n^T J_n$ and $J_n$ is a sub-Jacobian matrix corresponding to normal directions of the contact points, and $\lambda$ is a non-negative user-specified parameter;

and further wherein:
u represents the external forces,
h is a discretization time step,
w represents the velocity,
w' represents the next-step velocity,
M represents the joint-space inertia matrix,
n represents the vector of non-contact forces,
J represents the Jacobian, and
f represents the contact forces, and further wherein the superscript T indicates the transpose operation and the superscript −1 indicates the inverse operation.

14. The method of claim 12, wherein the non-contact forces comprise at least one of a Coriolis force, a centrifugal force, a gravitational force, a drag force, or a spring-damper force.

15. The method of claim 12, wherein the step of minimizing the scalar objective function is performed using a convex contact solver.

16. The method of claim 12, wherein the step of minimizing the scalar objective function is performed using an implicit contact solver.

17. The method of claim 12, wherein the plurality of rigid members comprise a robotic system, and further wherein the external forces are applied to the rigid members with controllable actuators.

* * * * *

UNITED STATES PATENT AND TRADEMARK OFFICE
CERTIFICATE OF CORRECTION

PATENT NO. : 8,731,880 B2  
APPLICATION NO. : 13/232954  
DATED : May 20, 2014  
INVENTOR(S) : E. V. Todorov Page 1 of 1

It is certified that error appears in the above-identified patent and that said Letters Patent is hereby corrected as shown below:

In the Claims

| COLUMN | LINE | ERROR |
|---|---|---|
| 16 (Claim 8, | 20 line 13) | after "wherein" insert --$J_n$-- |

Signed and Sealed this  
Twenty-eighth Day of October, 2014

Michelle K. Lee  
*Deputy Director of the United States Patent and Trademark Office*